No. 651,373. Patented June 12, 1900.
L. C. LORIN.
JARLESS HUB.
(Application filed Aug. 19, 1899.)
(No Model.)
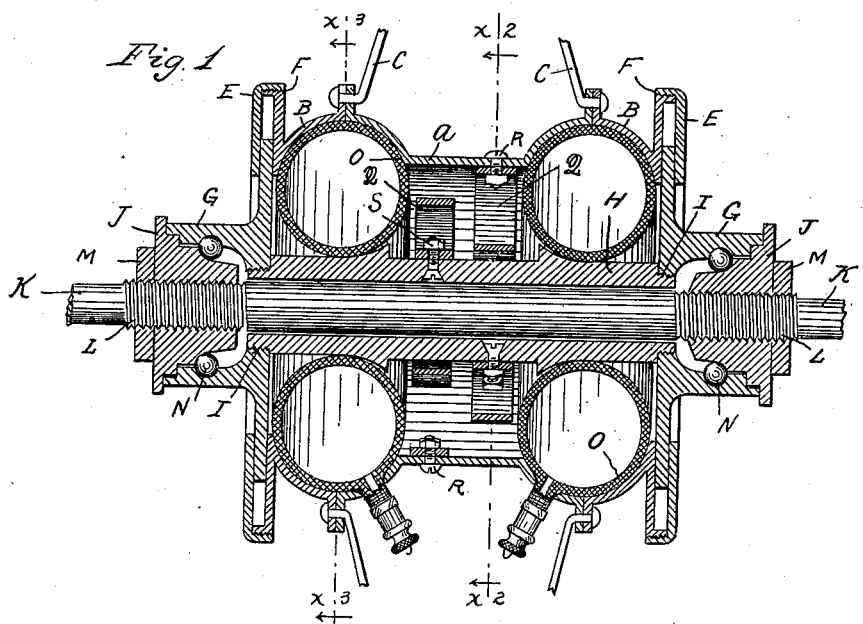
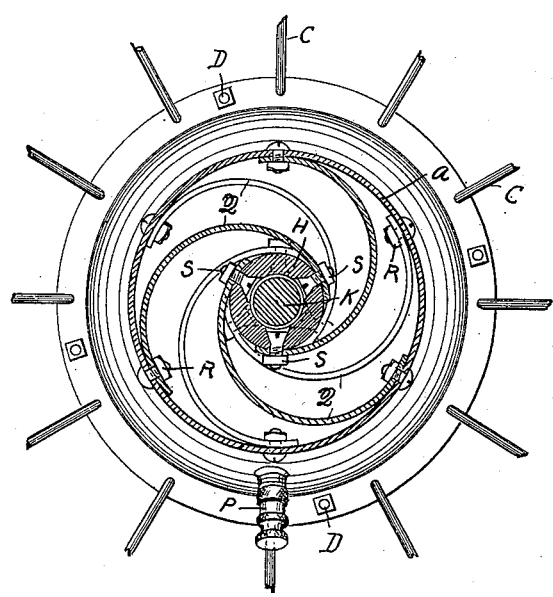
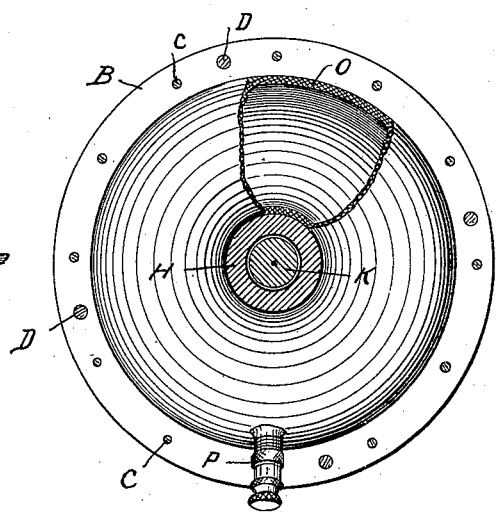
Witnesses
Inventor
Louis C. Lorin

UNITED STATES PATENT OFFICE.

LOUIS C. LORIN, OF ST. PAUL, MINNESOTA.

JARLESS HUB.

SPECIFICATION forming part of Letters Patent No. 651,373, dated June 12, 1900.

Application filed August 19, 1899. Serial No. 727,864. (No model.)

*To all whom it may concern:*

Be it known that I, LOUIS C. LORIN, a citizen of the United States, residing at St. Paul, in the county of Ramsey and State of Minnesota, have invented a Jarless Hub, of which the following is a specification.

My invention relates to an improvement in pneumatic hubs for vehicle-wheels; and it consists in the features of construction and combinations hereinafter particularly described and claimed.

In the accompanying drawings, forming part of this specification, Figure 1 is a longitudinal section of my hub. Fig. 2 is a section on line $x^2 x^2$ of Fig. 1, and Fig. 3 is a section on line $x^3 x^3$ of Fig. 1.

Forming part of the outer shell of the hub are the rings A and B, connected by bolts D and formed with outwardly-projecting flanges through which pass the ends of the spokes C. The outer edges of the rings B are formed with flanges F, upon which are threaded the wings E, forming an intermediate space to receive the edges of the disks G. As shown, the disks G are threaded upon the sleeve H, surrounding the axle K. Secured upon the outer ends of the axle by threads L are thimbles J, between which thimbles and the disks G are arranged balls N, constituting a ball-bearing. Adapted to be arranged in contact with the thimbles J are suitable retaining-bolts M. Surrounding the axle is a pair of pneumatic tubes O, the sleeve H and the plates A and B being shaped to receive said tubes, as shown in Fig. 1. Said tubes are supplied with air through suitable valves P. Intermediate of the tubes O is arranged a series of curved springs Q, the inner ends of said springs being secured to the axle-sleeve H by bolts S and the outer ends being secured to the ring A by bolts B.

It will be evident that the springs Q and the tubes O will coöperate to give the necessary resiliency. The edges of the disks G fit snugly in the space between the parts F and D, preventing the inlet of sand.

I claim—

1. The combination with a sleeve or axle, of a surrounding shell, springs arranged intermediate of said axle and shell, and similarly-arranged pneumatic tubes.

2. The combination with a sleeve or axle, and a surrounding shell, of a series of springs connecting said shell and said sleeve or axle, and pneumatic tubes arranged intermediate of said shell and said sleeve or axle.

3. The combination with an axle, of an inclosing sleeve, a surrounding shell, disks secured upon the ends of said sleeve and slidable in said shell, a series of springs arranged between said shell and sleeve, and similarly-arranged pneumatic tubes.

LOUIS C. LORIN.

Witnesses:
HARVEY A. SUNDBERG,
WILL H. BRILL.